L. M. CROMWELL.
COTTON CHOPPER.
APPLICATION FILED JUNE 12, 1916.
1,226,754.
Patented May 22, 1917.
2 SHEETS—SHEET 1.
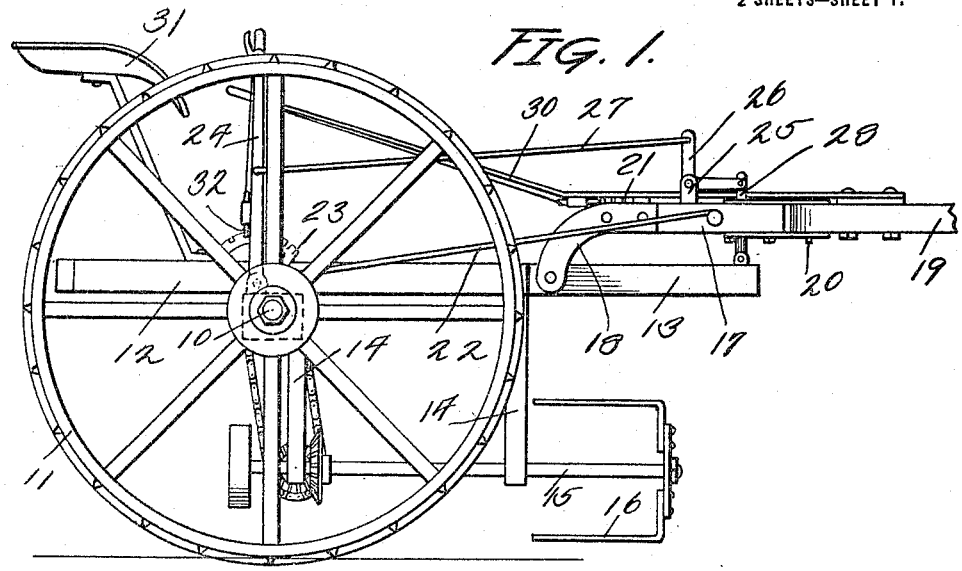
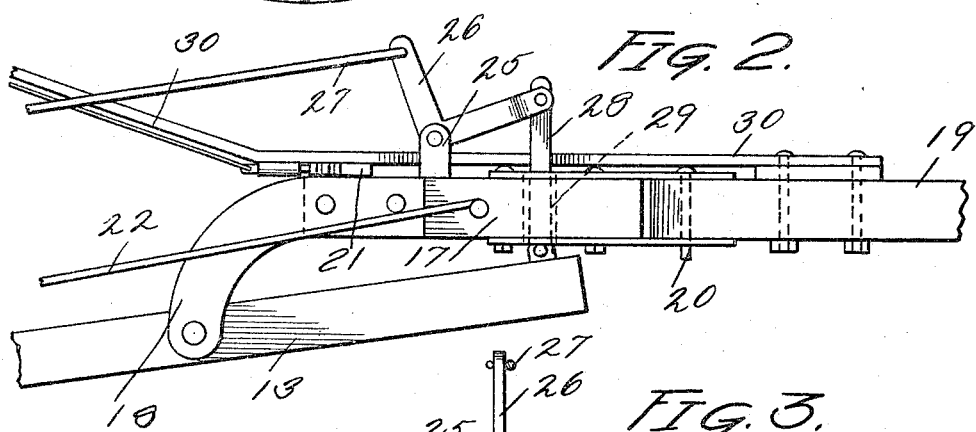
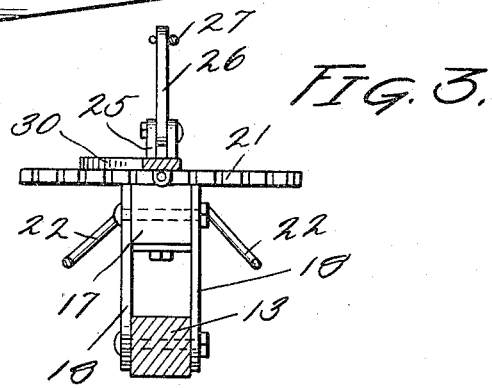
Inventor
L. M. Cromwell
Attorneys

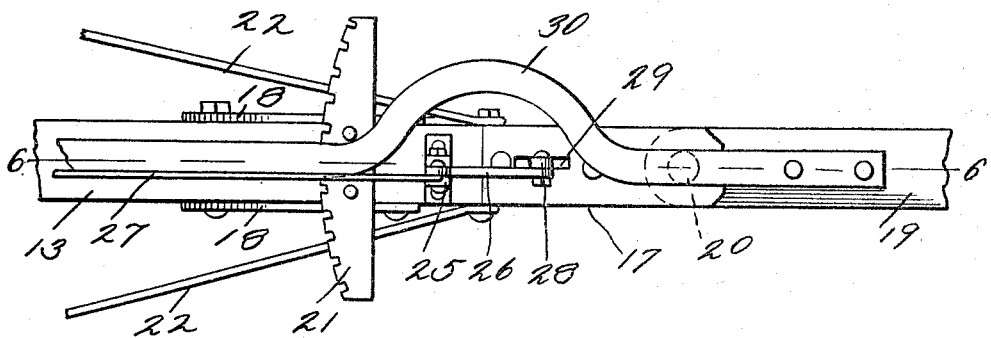
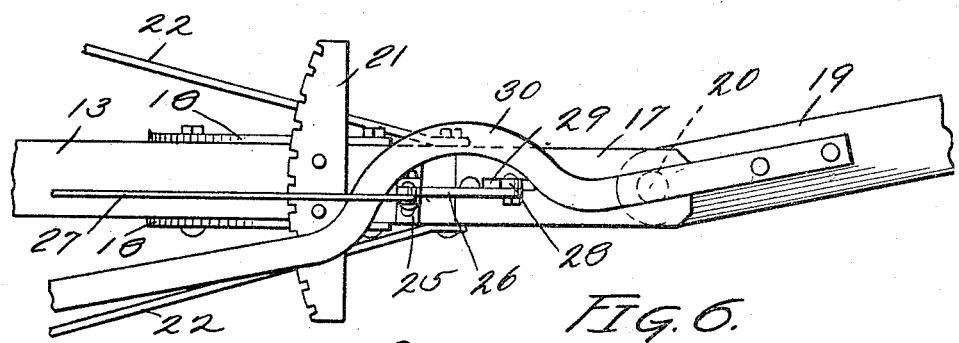
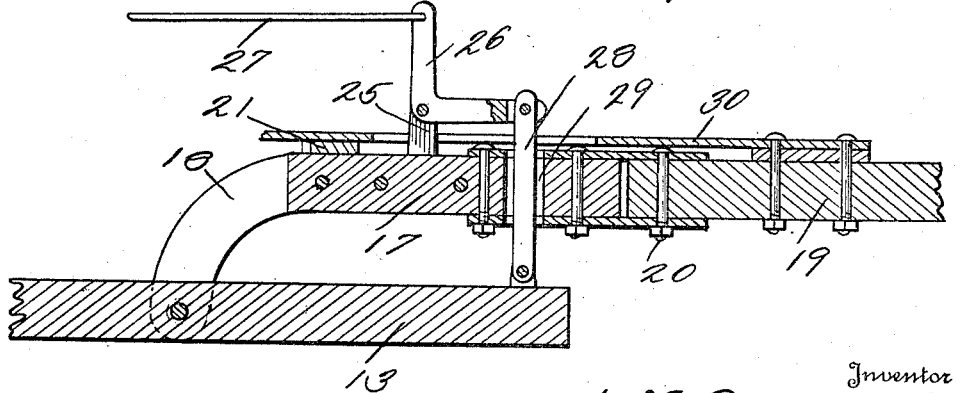

UNITED STATES PATENT OFFICE.

LEWIS M. CROMWELL, OF GRACEMONT, OKLAHOMA.

COTTON-CHOPPER.

1,226,754.

Specification of Letters Patent.

Patented May 22, 1917.

Application filed June 12, 1916. Serial No. 103,234.

*To all whom it may concern:*

Be it known that I, LEWIS M. CROMWELL, a citizen of the United States, residing at Gracemont, in the county of Caddo, State of Oklahoma, have invented certain new and useful Improvements in Cotton-Choppers; and I do hereby declare the following to be a full, clear, and exact description of the invention, such as will enable others skilled in the art to which it appertains to make and use the same.

This invention relates to improvements in cotton choppers.

The principal object of the invention is to provide a cotton chopping machine of such construction that the operator can readily control the chopper from the seat to raise and lower the same.

Another object is to provide a cotton chopper of such construction that the operator can readily move the chopper from side to side to reach plants which have grown up at points out of line of the row.

A further object is to provide a cotton chopper of such construction that the operator can easily guide the chopper to keep the same in the row especially when the row swerves to the right or left.

Other objects and advantages will be apparent from the following description, when taken in connection with the accompanying drawings.

In the drawings:

Figure 1 is a side elevation of a cotton chopping machine made in accordance with my invention;

Fig. 2 is an enlarged side elevation of the vertically and laterally shifting means;

Fig. 3 is a rear elevation of the same, partly in section;

Fig. 4 is an enlarged plan view of the connected portion of the reach and tongue in normal position;

Fig. 5 is an enlarged plan view of the same portions shown in Fig. 4, showing the operation of the lateral shifting lever;

Fig. 6 is an enlarged detail sectional view on the line 6—6 of Fig. 4.

Referring particularly to the accompanying drawings, 10 represents an axle on the ends of which are mounted the ground engaging supporting wheels 11. Mounted on the approximate center of the axle and extending forwardly therefrom is a frame 12, this frame being so mounted that it can swing vertically on the axle. Also mounted on the axle and extending forwardly beyond the front of the frame is a reach bar 13. Depending below and forming a part of the frame 12 are the converging arms 14 in the lower ends of which is rotatably mounted the chopper shaft 15. On the forward end of this shaft are mounted the chopper blades 16. Disposed over the forward portion of the reach bar is a longitudinally extending member 17, the rear end of which carries a pair of rearwardly and downwardly curved plates 18, said plates being pivotally connected with the reach bar. The forward end of the member 17 is connected to the rear end of a draft tongue 19 by means of a vertical pivot pin 20. On top of the member 17 is secured a rack segment 21 which will be described more fully hereinafter. From the member 17 to the axle there extend two braces 22.

Mounted over the axle is a rack segment plate 23 on which is pivoted the lever 24. Pivotally mounted at its angle in a bracket 25 carried by the forward end of the member 17 is a bell crank lever 26, the vertical arm of which is connected with the lever 24 by means of a connecting rod or link 27. The other arm of the bell crank is connected with a link 28 which extends downwardly through an opening 29 in the forward end of the member 17 and is pivotally connected to the forward end of the reach bar. Secured to the rear end portion of the tongue 19 is a lever 30 which extends rearwardly to a point within reach of the driver who is seated on the seat 31 carried by the rear end of the reach 13. The lever is provided with a pawl for engagement with the rack segment 21 hereinbefore mentioned. The lever 24 also carries a pawl 32 engaging with the segment 23. It will be noted that the seat 31 is disposed rearwardly of the axle.

When it is desired to raise or lower the chopper, the lever 24 is operated, which results in lifting or depressing the reach bar 13 and consequent raising and lowering of the frame 12 together with the chopper. The driver can assist the raising and lowering of the frame by shifting his weight backwardly or forwardly in the seat.

By moving the lever 30 to the right or left, the draft tongue or pole can be swung in the corresponding direction so that the direction of pull by the draft animals can be controlled and the chopper properly guided so as to be retained in line with the row of plants which are being chopped or to be swerved to the right or left to reach plants which have grown up out of line with the row.

What is claimed is:

In a cotton chopper, the combination with a wheeled frame having a reach member forming a part of the frame and extending forwardly therefrom, a pole having rearwardly and downwardly curved members on its rear end and pivotally connected to the reach member for vertical movement with relation thereto, said pole having its rear end divided and pivotally connected for horizontal swinging movement, means for adjustably moving the forward portion of the pole, an angle arm pivotally mounted on the rear portion of the pole, means for rocking the arm, and a vertical link passing through the rear portion of the pole and pivotally connected to one end of the arm and to the forward end of the reach member.

In testimony whereof, I affix my signature, in the presence of two witnesses.

LEWIS M. CROMWELL.

Witnesses:
S. L. ELDRIDGE,
W. GRANGER.

Copies of this patent may be obtained for five cents each, by addressing the "Commissioner of Patents, Washington, D. C."